US012096516B2

(12) United States Patent
Hong (10) Patent No.: US 12,096,516 B2
(45) Date of Patent: Sep. 17, 2024

(54) METHOD AND APPARATUS FOR OBTAINING SYSTEM MESSAGE, COMMUNICATION DEVICE, AND STORAGE MEDIUM (71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 325 days.

(21) Appl. No.: 17/574,070

(22) Filed: Jan. 12, 2022

(65) Prior Publication Data
US 2022/0141646 A1 May 5, 2022

Related U.S. Application Data (63) Continuation of application No. PCT/CN2019/095878, filed on Jul. 12, 2019.

(51) Int. Cl.
*H04W 8/18* (2009.01)
*H04W 60/04* (2009.01)

(52) U.S. Cl.
CPC ........... *H04W 8/183* (2013.01); *H04W 60/04* (2013.01)

(58) Field of Classification Search
CPC ..... H04W 8/183; H04W 60/04; H04W 88/06; H04W 12/45; H04W 12/40; H04W 12/43
See application file for complete search history.

(56) References Cited

U.S. PATENT DOCUMENTS

| 2012/0021726 | A1 | 1/2012 | Jie |
| 2012/0178500 | A1* | 7/2012 | Hwang ................. H04W 8/183 455/558 |
| 2014/0146732 | A1 | 5/2014 | Olufunmilola et al. |
| 2015/0065132 | A1 | 3/2015 | Ramkumar et al. |
| 2016/0174187 | A1* | 6/2016 | Gopala Krishnan ....................... H04B 1/3816 455/458 |
| 2016/0381710 | A1* | 12/2016 | Bansal .................. H04W 72/12 370/336 |

FOREIGN PATENT DOCUMENTS

| CN | 101977437 A | 2/2011 |
| CN | 102421088 A | 4/2012 |
| CN | 102421130 A | 4/2012 |
| CN | 104243605 A | 12/2014 |

(Continued)

OTHER PUBLICATIONS

Han Wei, A multicard terminal and synchronous method, Apr. 2012, pp. 1-8 (Year: 2012).*

(Continued)

*Primary Examiner* — Keith Ferguson
(74) *Attorney, Agent, or Firm* — Volpe Koenig (57) ABSTRACT

Embodiments of the application provide methods and apparatuses for obtaining system messages, the apparatuses including communication devices and storage media. A method for obtaining a system message includes: when a terminal includes at least two subscriber identification modules (SIMs), a predetermined system message received by the first SIM of the at least two SIMS is provided to at least one second SIM of the at least two SIMS.

14 Claims, 4 Drawing Sheets

(56) References Cited

FOREIGN PATENT DOCUMENTS

| | | | |
|---|---|---|---|
| CN | 104349420 | A | 2/2015 |
| CN | 107396435 | A | 11/2017 |
| CN | 107509240 | A | 12/2017 |
| CN | 108353362 | A | 7/2018 |
| CN | 109429304 | A | 3/2019 |
| EP | 3361797 | A1 | 8/2018 |
| EP | 3606250 | A1 | 2/2020 |

OTHER PUBLICATIONS

Chinese Office Action issued on Apr. 18, 2022 for Chinese Patent Application No. 201980001376.5.
ISA State Intellectual Property Office of the People's Republic of China Search Report Issued on Apr. 13, 2020 for Chinese Application No. PCT/CN2019/095878.
State Intellectual Property Office of the People's Republic of China, Office Action and Search Report Issued in Application No. 2019800013765, Oct. 9, 2021, 16 pages.
ISA State Intellectual Property Office of the People's Republic of China, International Search Report Issued in Application No. PCT/CN2019/095878, Apr. 13, 2020, WIPO, 6 pages.

\* cited by examiner

METHOD AND APPARATUS FOR OBTAINING SYSTEM MESSAGE, COMMUNICATION DEVICE, AND STORAGE MEDIUM

CROSS-REFERENCE TO RELATED APPLICATION

The present application is a continuation of International Application No. PCT/CN2019/095878 filed on Jul. 12, 2019, which is incorporated herein by reference in its entirety.

TECHNICAL FIELD

The present application relates to the field of wireless communication technologies, but is not limited to the field of wireless communication technologies, in particular to methods and apparatuses for obtaining system messages, communication devices and storage media.

BACKGROUND

At present, wireless communication processing methods for multi-SIM (Subscriber Identification Module) terminals are mainly implemented based on methods of each terminal manufacturer, and there is no unified standard to specify the processing methods for multi-SIM terminals. This has resulted in many different processing methods. For example, dual SIM single standby, dual SIM dual standby, dual SIM dual active, and the like. The current multi-SIM terminals generally have various subscriber identification module cards or data structures. For example, each SIM card generally applies for an International Mobile Equipment Identity (IMEI), and each International Mobile Subscriber Identification (IMSI) number corresponds to an IMEI.

The current network regards the SIM cards corresponding to different subscriber identification codes as different terminals. However, power consumption of a multi-SIM terminal is usually relatively large, and when one of the SIM cards is used for a call, there is still a long time delay.

SUMMARY

Embodiments of the application disclose methods and apparatuses for obtaining system messages, communication devices and storage media.

According to a first aspect of embodiments of the present disclosure, there is provided a method for obtaining a system message. The method includes:

when a terminal includes at least two subscriber identification modules, providing a first predetermined system message received by a first subscriber identification module of the at least two subscriber identification modules to at least one second subscriber identification module of the at least two subscriber identification modules for use thereby.

In an embodiment, the first predetermined system message includes a system message sent by a base station based on a request of the first subscriber identification module.

In an embodiment, providing the first predetermined system message received by the first subscriber identification module of the at least two subscriber identification modules to at least one second subscriber identification module of the at least two subscriber identification modules for use, including:
querying whether the first predetermined system message is stored on the first subscriber identification module;
when the first predetermined system message is stored on the first subscriber identification module and the first predetermined system message includes a second predetermined system message, transmitting the second predetermined system message stored on the first subscriber identification module to the second subscriber identification module for use thereby, where the second predetermined system message refers to a system message requested by the second subscriber identification module.

In an embodiment, the method further includes:
when determining that the second predetermined system message is not stored on the first subscriber identification module, sending a request to a base station through the second subscriber identification module for obtaining the second predetermined system message.

According to a second aspect of embodiments of the present disclosure, there is provided a communication device, including:
an antenna;
a memory;
and a processor, respectively connected with the antenna and the memory for controlling the antenna to send and receive wireless signals by executing an executable program stored on the memory, and performing operations including: when a terminal includes at least two subscriber identification modules, providing a first predetermined system message received by a first subscriber identification module of the at least two subscriber identification modules to at least one second subscriber identification module of the at least two subscriber identification modules for use thereby.

In an embodiment, the first predetermined system message includes a system message sent by a base station based on a request from the first subscriber identification module.

In an embodiment, providing the first predetermined system message received by the first subscriber identification module of the at least two subscriber identification modules to the at least one second subscriber identification module of the at least two subscriber identification modules for use thereby, including:
querying whether the first predetermined system message is stored on the first subscriber identification module;
when the first predetermined system message is stored on the first subscriber identification module and the first predetermined system message includes a second predetermined system message, transmitting the second predetermined system message stored on the first subscriber identification module to the second subscriber identification module for use thereby, where the second predetermined system message refers to a system message requested by the second subscriber identification module.

In an embodiment, the operations further includes:
when determining that the second predetermined system message is not stored on the first subscriber identification module, sending a request to a base station through the second subscriber identification module for obtaining the second predetermined system message.

According to a third aspect of embodiments of the present disclosure, there is provided a non-transitory computer readable storage medium, which stores an executable program, when the executable program is executed by a processor, the processor is caused to perform the steps of the methods for obtaining a system message provided by any of the above technical solutions.

In embodiments of the present disclosure, a method for obtaining system messages is provided, which includes: when a terminal includes at least two subscriber identification modules, providing the predetermined system message received by a first subscriber identification module of the at least two subscriber identification modules to at least one second subscriber identification module of the at least two subscriber identification modules for use thereby. In this way, the second subscriber identification module can obtain the predetermined system message from the first subscriber identification module without obtaining the predetermined system message from the base station by initiating random access. Thereby the power consumption of UE caused by random access, as well as a long time delay and a large amount of signaling overhead are reduced.

DETAILED DESCRIPTION OF THE EMBODIMENTS

Exemplary embodiments will be described in detail herein with the examples thereof illustrated in the drawings. When the following descriptions involve the drawings, like numerals in different drawings represent like or similar elements unless stated otherwise. Implementations described in the following exemplary embodiments do not represent all implementations consistent with the embodiments within the scope of the present application. Instead, they are merely examples of apparatuses and methods consistent with some aspects of the embodiments within the scope of the present application as detailed in the appended claims.

The terms used in the embodiments of the present disclosure are for the purpose of describing particular embodiments only and are not intended to limit the embodiments of the present disclosure. As used in the embodiments of the present disclosure and the appended claims, the singular forms "a", "an" and "the" are intended to include the plural forms as well, unless the context clearly indicates otherwise. It should also be understood that the term "and/or" as used herein refers to and includes any and all possible combinations of one or more of the associated listed items.

It shall be understood that, although the terms "first", "second", "third", and the like may be used herein to describe various information, the information should not be limited by these terms. These terms are only used to distinguish one type of information from another. For example, without departing from the scope of the embodiments of the present disclosure, first information may be referred as second information; and similarly, second information may also be referred as first information. As used herein, the terms "if" and "suppose" may be interpreted as "when" or "upon" or "in response to determining" depending on the context.

Figure 1:
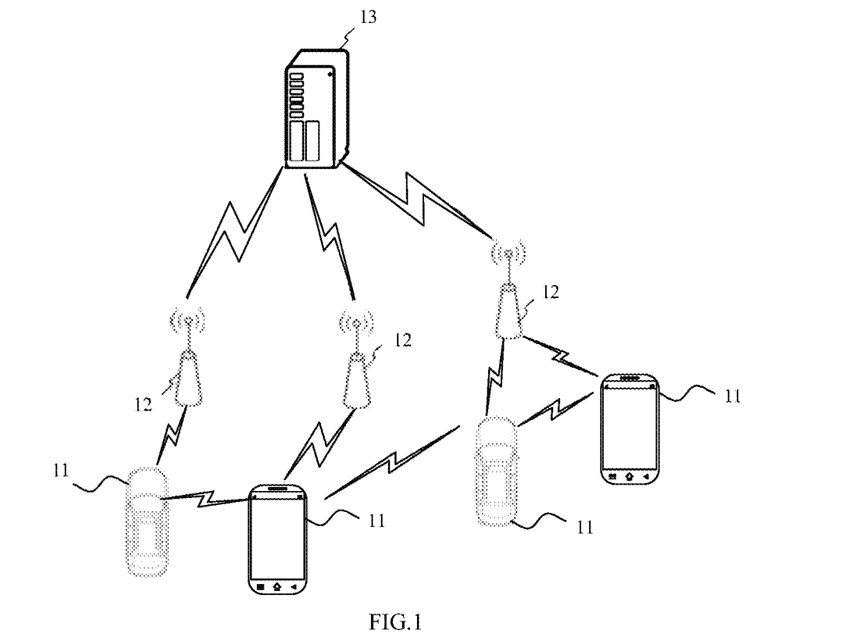
FIG. 1 is a schematic structural diagram of a wireless communication system according to embodiments of the disclosure.

Please refer to FIG. 1, which illustrates a schematic structural diagram of a wireless communication system provided by embodiments of the present disclosure. As shown in FIG. 1, a wireless communication system 100 is a communication system based on a cellular mobile communication technology. The wireless communication system 100 may include several terminals 11 and several base stations 12.

The terminal 11 may be a device that provides voice and/or data connectivity to a user. The terminal 11 can communicate with one or more core networks via a Radio Access Network (RAN). The terminal 11 may be an Internet of Things (IoT) terminal, such as a sensor, a mobile phone (also referred to as a "cellular" phone) and a computer with an Internet of Things terminal, for example, the computer may be a fixed, portable, pocket, handheld, computer device built-in or mounted within a vehicle. For example, the terminal 11 may be a station (STA), a subscriber unit, a subscriber station, a mobile station, a mobile radio station, a remote station, an access point, a remote terminal, an access terminal, a user terminal, a user agent, a user device, or a user equipment (UE). Alternatively, the terminal 11 may also be a device of an unmanned aerial vehicle (UAV). Alternatively, the terminal 11 may be a vehicle-mounted device, for example, a trip computer with wireless communication function, or a wireless communication device externally connected to the trip computer. Alternatively, the terminal 11 may also comprise an infrastructure, for example, it may comprise a street lamp, a signal lamp, or other infrastructure with wireless communication functionality.

The base station 12 may be a network side device in a wireless communication system, where the wireless communication system may be a 4th generation mobile communication (4G) system, also known as a Long Term Evolution (LTE) system; or, the wireless communication system may also be a 5G system, also known as a new radio (NR) system or a 5G NR system. Alternatively, the wireless communication system may also be a next generation system of a 5G system. An access network in a 5G system can also be referred to as a NG-RAN (New Generation-Radio Access Network), or an MTC (machine-type communication) system.

The base station 12 may be an evolved base station (eNB) used in the 4G system. Alternatively, the base station 12 may also be a base station adopting a central and distributed architecture in a 5G system (gNB). When the base station 12 adopts a central and distributed architecture, it can include a central unit (CU) and at least two distributed units (DUs). The central unit is provided with a protocol stack of a Packet Data Convergence Protocol (PDCP) layer, a Radio Link Control (RLC) layer, and a Media Access Control (MAC) layer; and the distributed unit is provided with a protocol stack of a Physical (PHY) layer. The embodiments of the present disclosure do not limit the specific implementation of the base station 12.

A wireless connection can be established between the base station 12 and the terminal 11 through an air interface. In various embodiments, the air interface is an air interface based on a fourth-generation mobile communication network technology (4G) standard; or, the air interface is an air interface based on a fifth-generation mobile communication network technology (5G) standard, for example, the air interface is new radio (NR); or, the air interface may also be an air interface based on a next generation mobile communication network technology standard of the 5G standard.

In some embodiments, an E2E (End to End) connection may also be established between the terminals 11, such as a V2V (vehicle to vehicle) communication, a V2I (vehicle to Infrastructure) communication and a V2P (vehicle to pedestrian) communication in a vehicle to everything (V2X) application.

In some embodiments, the above-mentioned wireless communication system may also include a network management device 13.

Several base stations 12 are connected to the network management device 13 respectively. The network management device 13 may be a core network device in a wireless communication system. For example, the network management device 13 may be a Mobility Management Entity (MME) in an Evolved Packet Core (EPC). Alternatively, the network management device may also be other core network devices, such as Serving Gate Way (SGW), Public Data Network Gate Way (PGW), a Policy and Charging Rules Function (PCRF) unit, a Home Subscriber Server (HSS), or the like. The implementation of the network management device 13 is not limited in embodiments of the present disclosure.

Figure 2:
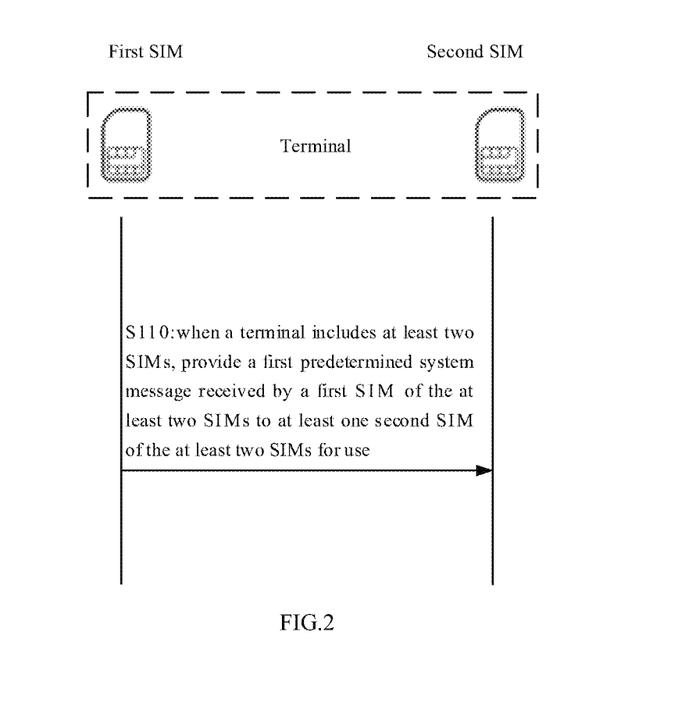
FIG. 2 is a schematic flowchart of a method for obtaining system messages according to an embodiment of the present disclosure.

As shown in FIG. 2, an embodiment of the present disclosure provides a method for obtaining system messages, including:

step S110: when a terminal includes at least two subscriber identification modules (SIMs), a first predetermined system message received by a first SIM of the at least two SIMS is provided to at least one second SIM of the at least two SIMS for use.

The terminal may be a multi-SIM terminal. The multi-SIM terminal is a terminal including multiple SIMS. The multi-SIM terminal may be a terminal including at least two SIMS, for example, a dual-SIM terminal or a three-SIM terminal. The behavior mode of the terminal including multiple SIMS may be dual SIM dual standby, dual SIM dual active, three SIM three standby, and the like. The SIM may comprise a Subscriber Identification Module (SIM) card or substrate that exists in a separate structural form, or, may comprise an embedded SIM (e-SIM) that exists inside the terminal in an embedded form, and the like.

The first predetermined system message is a system message used by the first SIM. In some cases, the first predetermined system message may include a second predetermined system message used by the second SIM, such as when the first SIM and the second SIM seek to obtain a same type of system message. The second predetermined system message may include but is not limited to: an on demand system message. The on demand system message may include system information available in a current cell and scheduling information of the system information available in the current cell.

An implementation process of receiving the first predetermined system message by the first SIM may include: when the terminal enters a cell, the terminal reads system messages using the first SIM; determines whether a first system message used by the first SIM is sent in the current cell; and if it is determined that the first system message is not sent in the current cell, the first SIM may send a request for notifying a network-side device to send the first system message. After the network-side device sends the first system message in response to the request, the first SIM receives the first system message sent by the network-side device within a corresponding time window. The network-side device may be a network device, for example, the network-side device may comprise one or more of various types of base stations, such as a 3G base station, a 4G base station, a 5G base station, a macro base station, a micro base station, or a small base station.

Methods for notifying the network-side device to send the system message by sending the request using the first SIM may include any of the following two methods: one method is to send a specific preamble sequence through a physical random access channel; and the other method is to send a Radio Resource Control System Information Request (RRC-SystemInfoRequest).

The first SIM and the second SIM may be electrically connected to a processor of the terminal. The first SIM provides the first predetermined system message including the second predetermined system message to the second SIM through operations or functions performed by the terminal processor. For example, the processor may read the second predetermined system message from the first SIM, and may send the second predetermined system message to the second SIM.

In some embodiments of the present disclosure, the second SIM may directly obtain the second predetermined system message from the first SIM, rather than first obtaining the second predetermined system message from the base station by initiating a random access procedure when the second predetermined system message is to be obtained, thereby reducing the power consumption of UE caused by initiating the random access procedure, as well as avoiding a long time delay and reducing a signaling overhead.

In an embodiment, in step S110, a first predetermined system message includes a system message sent by a base station based in response to a request from a first SIM.

An implementation process of sending the system message based in response to the request of the first SIM may include the following. A terminal selects a physical random access channel resource and a specific preamble sequence for sending via the random access channel resource according to the request of the first SIM. For example, the preamble sequence numbered 1 to 5 may be selected. The terminal sends the specific preamble sequence on the selected physical random access channel resource. After the base station receives the specific preamble sequence, the base station may determine a system message type that the first SIM is requesting based on the specific preamble sequence and a preset, known correspondence between the specific preamble sequence and the system message type. For example, the system message corresponding to the preamble sequence numbered 1 to 5 can correspond to system message type A. In that case, the base station sends the corresponding system message type A to the first SIM.

In an embodiment, in step S110, a first predetermined system message received by a first SIM of at least two SIMS is provided to at least one second SIM of the at least two SIMS for use, by operations including:

querying whether there is a first predetermined system message stored in a first SIM; and
  when the first predetermined system message is stored on the first SIM and the stored first predetermined system message includes a second predetermined system message, sending the second predetermined system message included by the first predetermined system message stored on the first SIM to the second SIM for use thereby.

After the first SIM receives the first predetermined system message, the first predetermined system message can be stored on a target storage area. The terminal processor electrically connected to the first SIM and the second SIM may be used to query whether stored data corresponding to the second predetermined system message is stored on the first SIM by addressing the target storage area. When the stored data of the second predetermined system message is stored in the target storage area of the first SIM, the processor obtains the stored data corresponding to the second predetermined system message and sends it to the second SIM.

Figure 3:
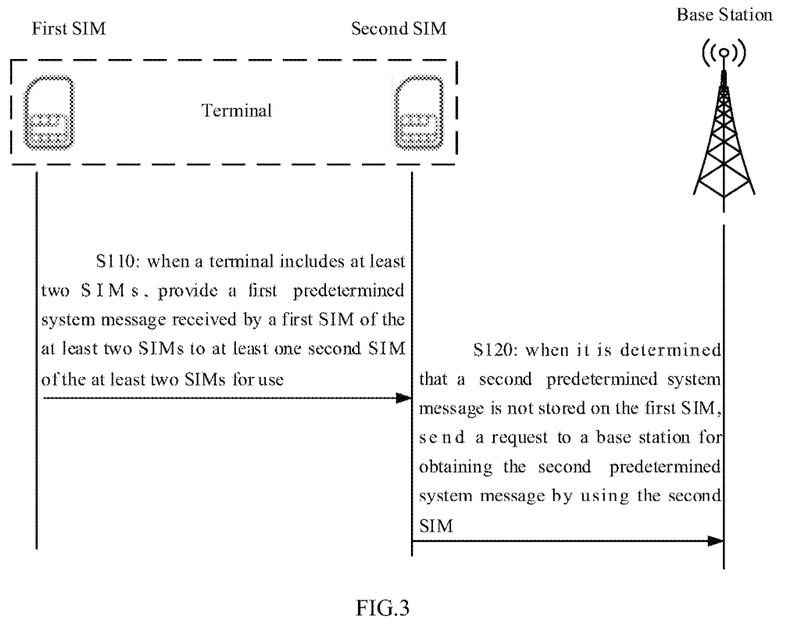
FIG. 3 is a schematic flowchart of a method for obtaining system messages according to another embodiment of the present disclosure.

As shown in FIG. 3, another embodiment of the present disclosure provides a method for obtaining system messages, which further includes:

step S120: when it is determined that a second predetermined system message is not stored on the first SIM, a request is sent to a base station for obtaining the second predetermined system message through the second SIM.

When it is determined that the second predetermined system message is not stored on the first SIM, the second SIM may send a system message request to the base station in various ways to obtain the second predetermined system message. The various ways may include any of: sending a specific preamble sequence through a physical random access channel; and sending a Radio Resource Control System Information Request (RRCSystemInfoRequest). After sending the system message request, a system message from a network-side device can be received through the second SIM during a corresponding time window.

Further, the present disclosure also provides a specific embodiment to further describe the method for obtaining system messages provided by the embodiments of the present disclosure.

Example 1

This example applies to a situation where multiple SIM cards (data structures) of a multi-SIM UE belong to the same operator network. Among them, the multi-SIM UE includes a SIM card 1 (first data structure) and a SIM card 2 (second data structure). In this example, the SIM card 2 seeks to obtain a system message. This example application provides a method for the SIM card 2 to obtain the system message. The method includes the following.

At step S210: querying whether there is an on demand system message stored on the SIM card 1.

A processor of the multi-SIM UE is used to query whether the on demand system message is stored on the SIM card 1 by addressing a target storage area. If the on demand system message is stored in the addressed target storage area, step S220 is performed; otherwise, step S230 is performed.

At step S220: the processor obtains the on demand system message and transmits it to the SIM card 2. Thus, the SIM card 2 does not need to initiate a random access procedure to a base station to request the on demand system message.

At step S230: The SIM card 2 requests the on demand system message from the base station using a random access procedure.

In this example application, the SIM card 2 can directly obtain the on demand system message from the SIM card 1, instead of obtaining the on demand system message from the base station by initiating the random access procedure, thereby reducing the power consumption of the UE caused by initiating the random access procedure, as well as avoiding a long time delay and reducing signaling overhead.

Figure 4:
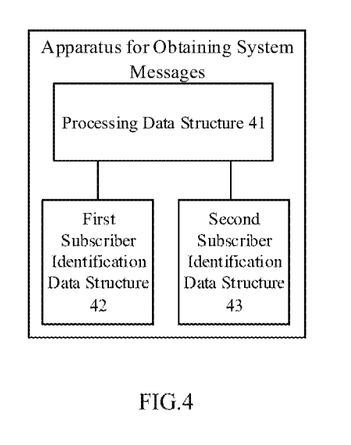
FIG. 4 is a schematic structural diagram of an apparatus for obtaining system messages according to an embodiment of the present disclosure.

As shown in FIG. 4, an embodiment of the present disclosure provides an apparatus for obtaining system messages, the apparatus including a processing data structure 41; where the processing data structure 41, is configured to provide a first predetermined system message received by a first subscriber identification data structure 42 of at least two subscriber identification data structures, to at least one second subscriber identification data structure 43 of the at least two subscriber identification data structures for use when a terminal includes at least two subscriber identification data structures.

The first subscriber identification data structure 42 and the second subscriber identification data structure 43 may be electrically operatively connected to the processing data structure 41. Examples of data structures comprising data structures 42 and 43 include, but are not limited to one or more of: a database, one or more data tables, one or more register structures, and one or more other memory substrates or portions thereof.

In an embodiment, the processing data structure 41 is further configured to include with the first predetermined system messages, second system messages sent by a base station in response to the request of the first subscriber identification data structure 42.

In an embodiment, the processing data structure 41 is further configured to query whether a first predetermined system message is stored on the first subscriber identification data structure 42. When the first predetermined system message is stored on the first subscriber identification data structure 42 and the first predetermined system message includes a second predetermined system message, the second predetermined system message stored on the first subscriber identification data structure 42 is transmitted to the second subscriber identification data structure 43 for use thereby.

In an embodiment, the processing data structure 41 is further configured to request a base station to obtain a second predetermined system message using the second subscriber identification data structure 43 when it is determined that the second predetermined system message is not stored on the first subscriber identification data structure 42.

Embodiments of the present disclosure also provide a communication device, including:
 an antenna;
 a memory;
 a processor, respectively connected with the antenna and the memory for controlling the antenna to send and receive wireless signals by executing an executable program stored on the memory, and can perform the steps of the methods described herein for obtaining system messages provided by any of the above embodiments.

The communication device provided in this embodiment may be an aforementioned terminal or base station. The terminal may be various human-carried terminals or vehicle-mounted terminals. The base station may comprise various types of base stations, for example, a 4G base station or a 5G base station.

The antenna may comprise one or more of various types of antennas, for example, a mobile antenna such as a 3G antenna, a 4G antenna, and/or a 5G antenna; the antenna may also include a Wi-Fi antenna or a wireless charging antenna, and the like.

The memory may include various types of storage media, and the storage media are non-transitory computer readable storage media that can continue to store information stored thereon after the communication device is powered off.

The processor may be connected to the antenna and the memory through a bus or the like, and is used to read the executable program stored on the memory, for example, in the course of carrying out at least one of the methods shown in FIGS. 2 to 3.

Embodiments of the present disclosure also provide a non-transitory computer readable storage medium, which stores an executable program, when the executable program is executed by a processor, the steps for obtaining system messages provided by any of the aforementioned embodiments are realized, for example, at least one of the methods shown in FIGS. 2 to 3.

Figure 5:
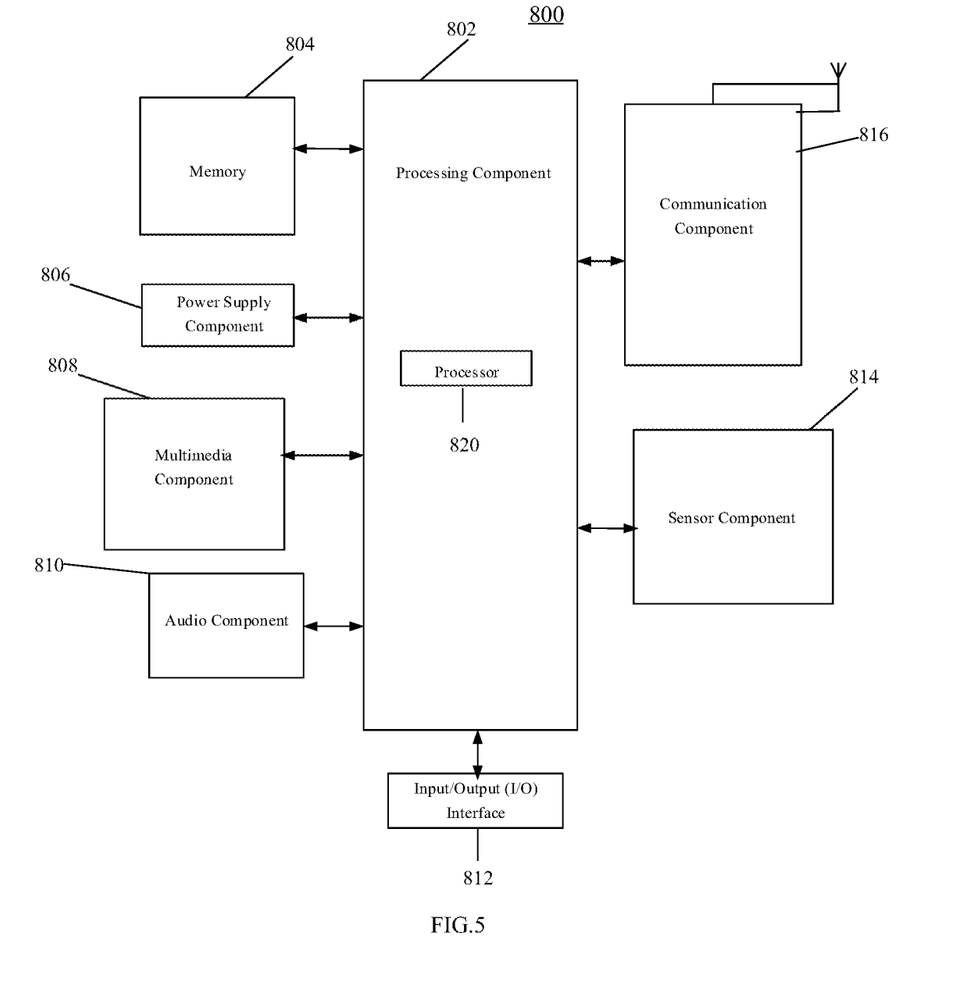
FIG. 5 is a schematic structural diagram of a terminal according to an embodiment of the present disclosure.

As shown in FIG. 5, an embodiment of the present disclosure provides a structure of a terminal.

Referring to the terminal 800 shown in FIG. 5, this embodiment provides a terminal 800. The terminal 800 may comprise a mobile phone, a computer, a digital broadcasting terminal, a messaging device, a game console, a tablet device, a medical device, a fitness device, a personal digital assistant, and the like.

Referring to FIG. 5, the terminal 800 may include one or more of the following components: processing component 802, memory 804, power supply component 806, which can be, e.g., a group of power supplies, multimedia component 808, which can be, e.g. a screen, audio component 810, which can be e.g., a microphone and a speaker, input/output (I/O) interface 812, sensor component 814, which can be, e.g., a group of sensors, and a communication component 816, which can be, e.g., a radio transceiver.

The processing component 802 generally controls overall operations of the terminal 800, such as operations associated with display, phone calls, data communications, camera operations, and recording operations. The processing component 802 may include one or more processors 820 for executing instructions for one or more of the processors 820 to perform all or a part of the steps of the above-described methods. Further, the processing component 802 may include one or more processor-executable modules comprising processor-executable instructions, which when executed by the one or more processors 820, facilitate cooperative interaction between the processing component 802 and other components. For example, the processing component 802 may include a multimedia module comprising processor-executable instructions which, when executed by the one or more processors 820, facilitate the interaction between the multimedia component 808 and the processing component 802.

The memory 804 is configured to store various types of data and/or processor-executable instructions to support operations at the terminal 800. Examples of such data include instructions for any application or method performed by or on the terminal 800, and may include, e.g., contact data, phonebook data, messages, pictures, videos, and the like. The memory 804 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power supply component 806 supplies power for various components of the terminal 800. The power supply component 806 may include a power supply management system, one or more power supplies, and other components associated with generating, managing and distributing power for the terminal 800.

The multimedia component 808 includes a screen providing an output interface between the terminal 800 and a user. In some embodiments, the screen may include a Liquid Crystal Display (LCD) and a Touch Panel (TP). If the screen includes a touch panel, the screen may be implemented as a touch screen for receiving an input signal from the user. The touch panel may include one or more touch sensors for sensing a touch, a slide and a gesture on the touch panel. The touch sensor may be operable not only to sense the boundary of a touch or slide operation but also to detect duration and pressure relating to the touch or slide operation. In some embodiments, the multimedia component 808 may include a front camera and/or a rear camera. When the terminal 800 is in an operation mode, such as a shooting mode or a video mode, the front camera and/or the rear camera may receive external multimedia data. Each of the front camera and the rear camera may be a fixed optical lens system or be of a focal length and have a capability of an optical zoom.

The audio component 810 is configured to output and/or input an audio signal. For example, the audio component 810 includes a microphone (MIC). When the terminal 800 is in an operating mode, such as a call mode, a record mode and a voice recognition mode, the microphone is to receive an external audio signal. The received audio signal may be further stored in the memory 804 or sent via the communication component 816. In some embodiments, the audio component 810 also includes a loudspeaker for outputting an audio signal.

The I/O interface 812 may provide an interface between the processing component 802 and peripheral interface devices and may include one or more modules comprising processor-executable instructions for execution by one or more processors of I/O interface 812 and/or by one or more processors 820 of processing component 802. The peripheral interface devices may include, e.g., a keyboard, a click wheel, buttons and the like. Such buttons may include but are not limited to, a home button, a volume button, a start button and a lock button, and the like.

The sensor component 814 may include one or more sensors to provide state assessments of various states and aspects of the terminal 800. For example, the sensor component 814 may detect an on/off state of the terminal 800 and a relative location of one or more devices and components. For example, such devices can comprise a display and a keypad of the terminal 800. The sensor component 814 may also detect a position change of the terminal 800 or a position change of a component of the terminal 800, presence or absence of a touch of the user on the terminal 800, an orientation or acceleration/deceleration of the terminal 800, and a temperature change of the terminal 800. The sensor component 814 may include a proximity sensor configured to detect the presence of a nearby object in the absence of physical contact. The sensor component 814 may also include an optical sensor, such as a CMOS or CCD image sensor for use in an imaging application. In some embodiments, the sensor component 814 may also include an acceleration sensor, a gyro sensor, a magnetic sensor, a pressure sensor, or a temperature sensor.

The communication component 816 is configured to facilitate wired or wireless communication between the terminal 800 and other devices. The terminal 800 may access a wireless network based on a communication standard, such as Wi-Fi, 2G or 3G, or a combination thereof. In an exemplary embodiment, the communication component 816 may receive a broadcast signal or broadcast-related information from an external broadcast management system via a broadcast channel. In an exemplary embodiment, the communication component 816 may also include a Near Field Communication (NFC) device to facilitate short-range communications. For example, the NFC device may be implemented based on a radio frequency identification (RFID) technology, an infrared data association (IrDA) technology, an Ultra Wide Band (UWB) technology, a Bluetooth (BT) technology, and other technologies.

In exemplary embodiments, the terminal 800 may be implemented by one or more Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements, for performing the above methods.

In exemplary embodiments, a non-transitory computer readable storage medium including instructions is also provided, such as the memory 804 including instructions. The above instructions may be executed by the processor 820 of the terminal 800 to complete the above method. For example, the non-transitory computer readable storage medium may be a ROM, a RAM, a CD-ROM, a magnetic tape, a floppy disc, an optical data storage device, and the like.

The terminal can be used to implement the aforementioned methods for obtaining system message, for example, the methods for obtaining system messages as shown in FIGS. 2 to 3.

Figure 6:
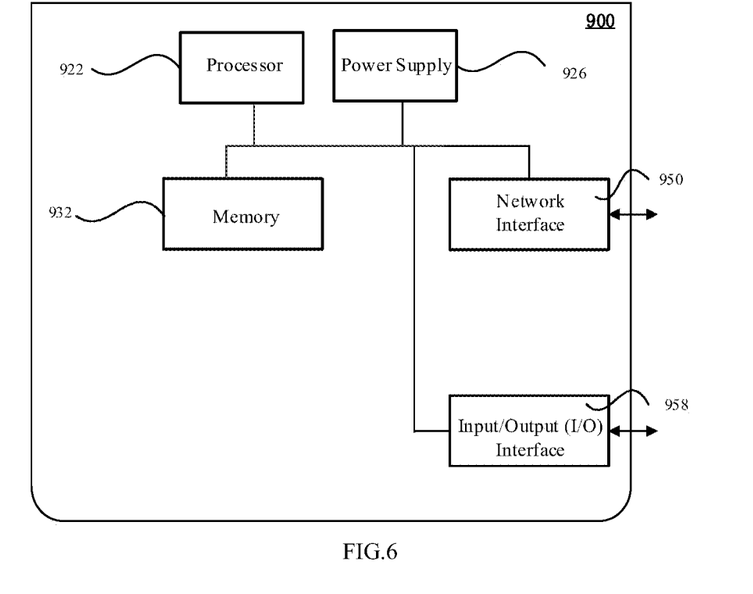
FIG. 6 is a schematic structural diagram of a base station according to an embodiment of the present disclosure.

As shown in FIG. 6, an embodiment of the present disclosure provides a structure of a base station. For example, a base station 900 may be provided as a network-side device. Referring to FIG. 6, the base station 900 may include a processor 922, which comprises one or more processors and memory resources comprising a memory 932 for storing processor-executable instructions that can be executed by the processor 922, such as instructions comprising an application program. The application program stored in the memory 932 may include one or more modules, each of which comprises a corresponding set of processor-executable instructions. Further, the processor 922 is configured to execute the instructions to perform the methods for obtaining system messages provided by any of the above-described embodiments, for example, the methods for obtaining system messages as shown in FIGS. 2 to 3.

The base station 900 may also include a power supply 926 configured to perform power management of the base station 900, a wired or wireless network interface 950 configured to connect the base station 900 to a network, and an input/output (I/O) interface 958. The base station 900 may be operated based on an operating system comprising instructions stored in the memory 932, such operating systems may include, e.g., Windows Server™, Mac OS X™, Unix™, Linux™ and FreeBSD™.

The wireless network interface 950 includes but is not limited to the antenna of the aforementioned communication device. Other implementations of the present disclosure will be apparent to those skilled in the art from consideration of the specification and practices of the present application described herein. The present application is intended to include any variations, uses and adaptive changes within the scope of the present application. These variations, uses and adaptive changes are within the scope where they follow the general principle of the present application and include common knowledge or conventional technical means in the prior art not disclosed in the present disclosure. The specification and embodiments herein are intended to be considered as exemplary only, and the real scope and spirit of the present application are indicated by the appended claims.

It is to be understood that the present application is not limited to the precise structures described above and shown in the accompanying drawings and these structures may be modified or changed without departing from the scope thereof. The scope of protection of the present application is limited by the appended claims only.

The invention claimed is:

1. A method of obtaining a system message, comprising:
selecting, by a terminal, a physical random access channel resource and a specific preamble sequence according to a request of a first subscriber identification module (SIM);
sending, by the terminal, the specific preamble sequence on the selected physical random access channel resource to a base station;
receiving, by the first SIM of the terminal, a first predetermined system message, wherein the first predetermined system message comprises a system message determined by the base station based on the specific preamble sequence and a preset correspondence between the specific preamble sequence and a system message type after receiving the specific preamble sequence; and
when the terminal comprises at least two SIMs, providing, by a processor of the terminal, the first predetermined system message received by the first SIM of the at least two SIMs to at least one second SIM of the at least two SIMs.

2. The method according to claim 1, wherein providing the first predetermined system message received by the first SIM of the at least two SIMs to the at least one second SIM of the at least two SIMs, comprises:
querying whether the first predetermined system message is stored on the first SIM; and
when the first predetermined system message is stored on the first SIM and the first predetermined system message comprises a second predetermined system message, transmitting the second predetermined system message comprised by the first predetermined system message stored on the first SIM to the second SIM, wherein the second predetermined system message identifies a system message requested by the second SIM.

3. The method according to claim 2, further comprising:
when determining that the second predetermined system message is not stored on the first SIM, sending a request to the base station through the second SIM for obtaining the second predetermined system message.

4. The method according to claim 2, wherein the second predetermined system message comprises an on demand system message.

5. The method according to claim 1, wherein the first predetermined system message is stored on a target storage area of the first SIM.

6. The method according to claim 1, wherein before selecting, by the terminal, the physical random access channel resource and the specific preamble sequence sending via the physical random access channel resource according to the request of the first SIM, the method further comprises:
when the terminal enters a cell, reading, by the terminal, system messages through the first SIM; and determining whether a first system message used by the first SIM is sent in the cell; and in response to determining that the first system message is not sent in the cell, sending, by the first SIM of the terminal, the request for notifying the base station to send the first system message.

7. The method according to claim 1, wherein the system message is received by the first SIM within a corresponding time window.

8. The method according to claim 1, wherein the specific preamble sequence is used to request a predetermined system message.

9. A communication device, comprising:
an antenna;
a memory;
a processor, respectively connected with the antenna and the memory for controlling the antenna to send and receive wireless signals by executing an executable program stored on the memory, and performing operations comprising:
selecting, by the communication device, a physical random access channel resource and a specific preamble sequence according to a request of a first subscriber identification module (SIM);
sending, by the communication device, the specific preamble sequence on the selected physical random access channel resource to a base station;
receiving, by the first SIM of the communication device, a first predetermined system message, wherein the first predetermined system message comprises a system message determined by the base station based on the specific preamble sequence and a preset correspondence between the specific preamble sequence and a system message type after receiving the specific preamble sequence; and
when the communication device comprises at least two SIMs, providing the first predetermined system message received by the first SIM of the at least two SIMs to at least one second SIM of the at least two SIMs.

10. The communication device according to claim 9, wherein providing the first predetermined system message received by the first SIM of the at least two SIMs to the at least one second SIM of the at least two SIMs, comprises:
querying whether the first predetermined system message is stored on the first SIM; and
when the first predetermined system message is stored on the first SIM and the first predetermined system message comprises a second predetermined system message, transmitting the second predetermined system message stored on the first SIM to the second SIM, wherein the second predetermined system message identifies a system message requested by the second SIM.

11. The communication device according to claim 10, further comprising:
when determining that the second predetermined system message is not stored on the first SIM, sending a request to the base station through the second SIM for obtaining the second predetermined system message.

12. A non-transitory computer readable storage medium, which stores processor-executable instructions, wherein when the processor-executable instructions are executed by a processor, the processor is caused to perform operations comprising:
selecting, by a terminal, a physical random access channel resource and a specific preamble sequence according to a request of a first subscriber identification module (SIM);
sending, by the terminal, the specific preamble sequence on the selected physical random access channel resource to a base station;
receiving, by the first SIM of the terminal, a first predetermined system message, wherein the first predetermined system message comprises a system message determined by the base station based on the specific preamble sequence and a preset correspondence between the specific preamble sequence and a system message type after receiving the specific preamble sequence; and
when the terminal comprises at least two SIMs, providing the first predetermined system message received by the first SIM of the at least two SIMs to at least one second SIM of the at least two SIMs.

13. The non-transitory computer readable storage medium according to claim 12, wherein providing the first predetermined system message received by the first SIM of the at least two SIMs to the at least one second SIM of the at least two SIMs, comprises:
querying whether the first predetermined system message is stored on the first SIM; and
when the first predetermined system message is stored on the first SIM and the first predetermined system message comprises a second predetermined system message, transmitting the second predetermined system message stored on the first SIM to the second SIM, wherein the second predetermined system message identifies a system message requested by the second SIM.

14. The non-transitory computer readable storage medium according to claim 13, further comprising:
when determining that the second predetermined system message is not stored on the first SIM, sending a request to the base station through the second SIM for obtaining the second predetermined system message.

* * * * *